United States Patent [19]

Troope

[11] 3,948,490

[45] Apr. 6, 1976

[54] METHOD FOR MIXING VOLATILE LIQUID WITH NON-VOLATILE MATERIAL

[75] Inventor: Walter S. Troope, Latham, N.Y.

[73] Assignee: Cluett, Peabody & Co., Inc., New York, N.Y.

[22] Filed: Mar. 5, 1975

[21] Appl. No.: 555,637

Related U.S. Application Data

[62] Division of Ser. No. 234,442, March 9, 1972, Pat. No. 3,885,587.

[52] U.S. Cl......................... 259/4 R; 8/158; 8/85 A; 259/7; 259/65

[51] Int. Cl.[2].................... B01F 15/02; G05D 11/02

[58] Field of Search................ 259/4, 5, 6, 7, 8, 18, 259/19, 36, 60, 61, 64, 65, 66, 67; 137/391, 393; 8/158, 85 A

[56] References Cited

UNITED STATES PATENTS

| | | | |
|---|---|---|---|
| 2,758,716 | 8/1956 | Oswald | 259/4 |
| 2,900,176 | 8/1959 | Krogel | 259/4 |
| 2,959,055 | 11/1960 | True | 137/391 |
| 3,765,442 | 10/1973 | Nettles | 137/391 |

*Primary Examiner*—Robert W. Jenkins
*Assistant Examiner*—James A. Niegowski

[57] ABSTRACT

A method and apparatus for mixing and feeding a volatile liquid, such as liquid ammonia, with a non-volatile material, such as a fabric finisher; the method comprising the steps of feeding the liquid to a mixing vessel and, by volatilizing a portion of the liquid, cooling the vessel and, while continuing to feed the liquid and after the cooled liquid has reached a predetermined level in the vessel, adding to the liquid a measured amount of non-volatile material, continuing the liquid feed until the liquid level reaches the measured amount, agitating the liquid and material and, as the liquid volatilizes, adding additional of such liquid to maintain the liquid level at the measured amount; the apparatus comprising a mixing tank having a cover, a coolant coil in the mixing tank, first feed means having a valve for feeding a volatile liquid to the tank, second feed means having a valve for feeding a non-volatile material to the tank, a float and switch in the tank for controlling the liquid feed valve, a float and switch in the tank for controlling the non-volatile material feed valve, a discharge line for discharging the mixed material from the tank to a trough in a fabric treatment chamber, a valve in the discharge line, electrical means for opening and closing the valve in the discharge line and for closing the liquid feed valve when the discharge valve is open and closing such liquid feed valve when the discharge valve is open, the floats in the tank opening and closing the liquid feed and material feed valves when the liquid in the tank is at pre-set levels.

12 Claims, 1 Drawing Figure

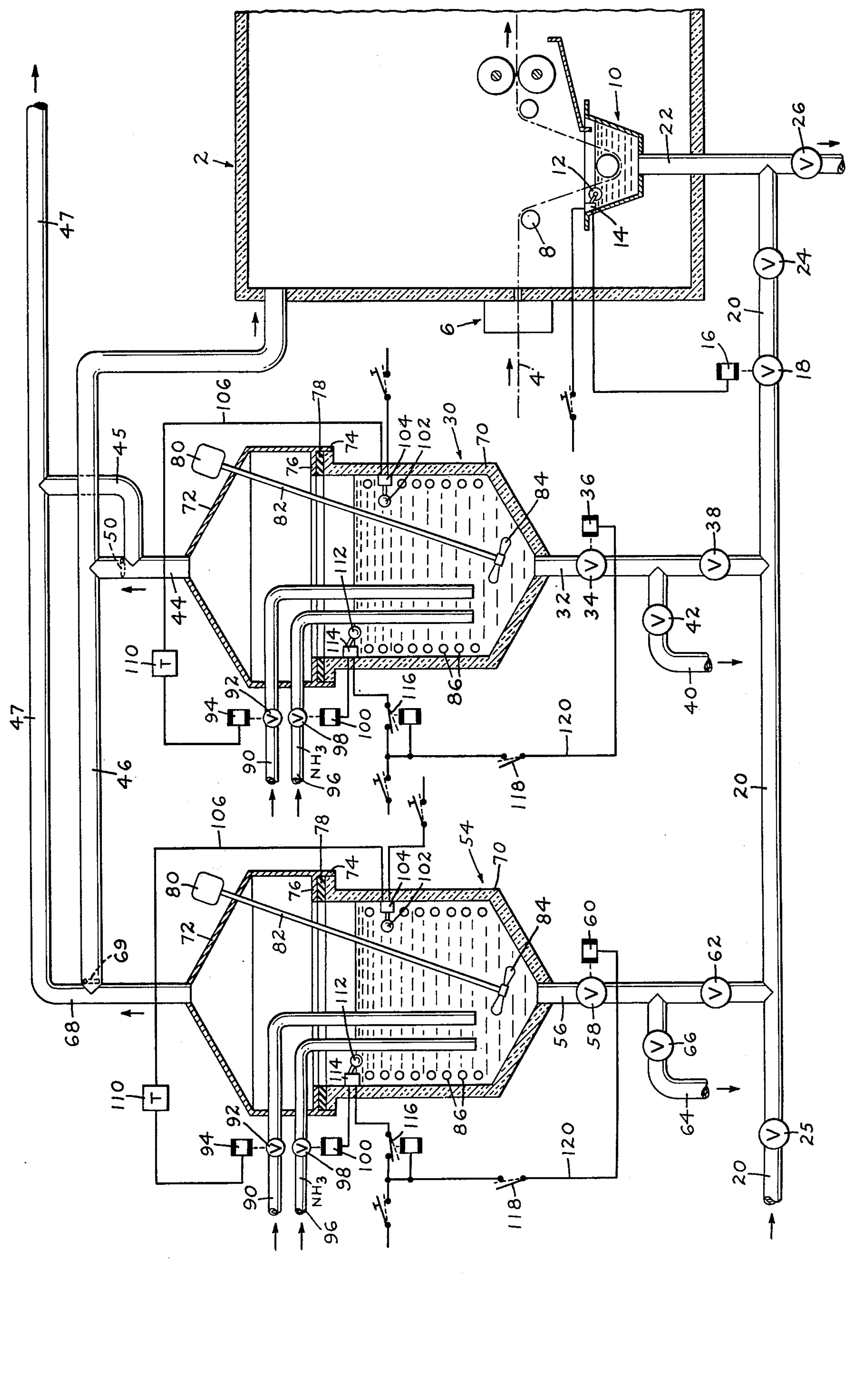
T
NH3
V

METHOD FOR MIXING VOLATILE LIQUID WITH NON-VOLATILE MATERIAL

This is a division of application Ser. No. 234,442, filed Mar. 9, 1972 now U.S. Pat. No. 3,885,587 issued 5-27-75.

This invention relates to a method and apparatus for mixing highly volatile liquid with non-volatile materials for the treatment of fabric and, more particularly, to such a method and apparatus for mixing liquid ammonia with resins, dyes or other finishing agents for the treatment of fabric to make such treated fabric crease and wrinkle resistant.

In U.S. patent application Ser. No. 834,730, filed June 19, 1969 now abandoned, there is shown and described apparatus for treating fabric with ammonia or ammonia with additives, such as resin. The fabric is fed into a chamber having an ammonia saturated atmosphere and immersed in a trough containing liquid ammonia or liquid ammonia and additives. In the trough, the fabric is saturated. After the fabric is fed out of the trough, the ammonia is driven off.

Liquid ammonia, at atmospheric conditions, is highly volatile and is usually stored under pressure and, in storage under pressure, may be refrigerated. In the apparatus of the aforementioned application, the treatment cabinet is insulated. The ammonia vaporized therein reduces the temperature of the cabinet atmosphere to a relatively low temperature. Thus, while the volume of liquid ammonia in the fabric immersion trough is relatively low, the relatively low temperature of the cabinet atmosphere and the ammonia vapor saturated condition of such atmosphere prevents significant vaporization of the liquid ammonia from the immersion trough while fabric is being treated. Thus, because the liquid ammonia in the ammonia immersion trough in the treatment chamber does not vaporize, the proportion of non-volatile additives, such as resin, in the liquid ammonia in the immersion trough can be maintained at a substantially constant level. This is important because, if there is substantial variation in the additive content of the liquid ammonia as the fabric is passed therethrough, the amount of additive, such as resin, deposited on such fabric will vary, resulting in marked variations in the properties of the fabric after treatment.

The addition of the additives to the liquid ammonia, and the uniform dispersion of such additives therein, is of substantial importance to the depositing of the additives on the fabric in a uniform manner. Thus, in order that the additive, such as dye, resin, or other fabric finisher might be added to the liquid ammonia in uniform quantity and might be uniformly dispersed in the liquid ammonia, it is desirable to make such addition to the liquid ammonia and disperse the additive therein before the mixture is fed to the fabric immersion trough. This is accomplished, in the instant invention, by mixing tanks located outside of the treatment cabinet. Such tanks are connected to the immersion trough so that, as the liquid ammonia-additive mixture is required in the immersion trough, it is fed to the trough automatically from the mixture tank.

In the apparatus of the instant invention, two tanks are provided. While the liquid ammonia-additive mixture is being fed from one tank to the fabric immersion trough in the treatment chamber, the other tank is being charged with liquid ammonia and additive, such as resin, and the additive is being dispersed in the liquid ammonia. The liquid ammonia, as it may vaporize from the mixing tank during charging and dispersion in such tank, is automatically replaced with liquid ammonia to maintain the liquid ammonia-additive proportion at a constant level until such time as the mixture in such tank is fed to the immersion trough in the treatment chamber. Thus, in the process and apparatus of the instant invention, the immersion trough in the treatment chamber is constantly supplied with a liquid ammonia-additive mixture in which the additive content and additive dispersion is maintained at a constant uniform level.

The invention and advantages thereof will be better understood from the following description and appended drawing.

Referring to the drawing, the apparatus of the instant invention includes treatment cabinet, generally designated 2, into which fabric 4 is fed through seal, generally designated 6, and around roll 8 into immersion trough, generally designated 10, all as more particularly described in the afore-mentioned U.S. patent applications.

For purposes more fully described later herein, trough 10, has, near its upper level, float 12 connected to micro-switch 14. Micro-switch 14 is connected to solenoid 16 of valve 18 in supply line 20. Supply line 20 is connected to supply line 22 of trough 10. Supply line 20 has manual valves 24, 25 and supply line 22 has a manual valve 26. During normal operation, manual valve 24 is opened and valve 26 is closed. During shut down or when it may be desired to empty immersion trough 10, manual valve 24 in supply line 20 is closed and valve 26 in supply 22 is opened.

Mixing tank, generally designated 30, is connected to supply line 20 through connecting line 32. Valve 34, controlled by solenoid 36, and manual valve 38 are in connecting line 32 between mixing tank 30 and supply line 20. Intermediate valves 34, 38 dump line 40, having manual valve 42, is connected to line 32. The upper end of mixing tank 30 is connected, by vent line 44, to duct 46 connected to the interior of chamber 2 and by vent line 45 to duct 47. Duct 47 is connected to the stack, not shown, of chamber 2. Flapper valve 50 at the junction of vent lines 44, 45 vents tank 30 to either duct 46 and chamber 2 or to duct 47 and the stack, not shown.

A second mixing tank, generally designated 54, is connected to supply line 20 through connecting line 56. Valve 58, controlled by solenoid 60 and manual valve 62 are in connecting line 56 between mixing tank 54 and supply line 20. Intermediate valves 58, 62, dump line 64, having manual valve 66, is connected to line 56. The upper end of mixing tank 54 is connected, by vent line 68, to duct 46 and duct 47. Flapper valve 69 at the junction of line 68 and duct 46, selectively vents tank 54 to duct 46 and chamber 2 or to duct 47 and the stack, not shown.

Mixing tanks 30, 54 are identical and each have identical liquid ammonia and resin feeds, feed controls and control circuitry. Hence, in the following description, one of the mixing tanks and the control circuitry will be described, it being understood that the other tank includes the same elements.

Mixing tank 30 includes mixing chamber 70 of heat insulating material such as, for example, inner and outer metal shells filled, intermediate the shells, with a non-heat conducted material. Cover 72, preferably removable, has a downwardly extending flange 74 and inwardly extending flange 76 which, with seal 78, forms a vapor-tight seal at the upper end of mixing chamber 70. Mixer 80, having shaft 82 and mixing impeller 84, is mounted on cover 72. Coolant coil 86, fed with a coolant from a condenser and compressor, not shown, is mounted in mixing chamber 70 around the periphery thereof. Additive supply line 90, having valve 92, controlled by solenoid 94, and liquid ammonia line 96, having valve 98, controlled by solenoid 100, extend downwardly into mixing chamber 70 and, as later described, feed liquid ammonia and additive into tank 30. Float 102 is connected to micro-switch 104 and micro-switch 104 is connected, through lead 106, and timer 110 to solenoid 94. Float 112 is connected to micro-switch 114 and micro-switch 114 is connected to solenoid 100. Solenoid switch 116 is normally closed and is opened when switch 118 in line 120, connected to solenoid 36, is closed for reasons later explained herein.

In the operation of chamber 2 for the treatment of fabric 4 by immersing and saturating the fabric to be treated with ammonia, trough 10 may be supplied with liquid ammonia through supply lines 20, 22 or with liquid ammonia-additive mixture. When liquid ammonia, alone, is employed, valves 24 and 25 in supply line 20 are opened and manual valves 26, 38, 62, in supply line 22 and connecting lines 32, 56, respectively, are closed. When the fabric is to be treated with liquid ammonia-additive mixture, manual valve 25 in supply line 20 is closed and manual valves 38 and 62 in connecting lines 32, 56, respectively, are opened.

The following description of the operation of the apparatus and method of the instant invention is for treatment of the fabric in immersion trough 10 with liquid ammonia-additive mixture. Such additive may be resins, dyes or other fabric finishes. Hence, manual valve 25 in supply line 20 and manual valve 26 in supply line 22 are closed and manual valve 24 in supply line 20 and manual valves 38, 62 in connecting lines 32, 56 are open. Prior to the start of such treatment, one of the mixing tanks has been charged with liquid ammonia and additive and such additive has been dispersed therein, in the manner hereinafter described. The various switches connecting the electrical controls to a source of power, not shown, have been closed and switch 118 on electrical lead 120 to solenoid 36 has been closed, opening solenoid switch 116. Solenoid 36 opens valve 34 and the liquid ammonia-additive mixture in such charged tank is fed through the connecting line into supply line 20. As the level of liquid ammonia-additive mixture in trough 10 drops, float 12 closes, switch 14 actuates solenoid 16 and opens valve 18, allowing the liquid ammonia-additive mixture from the charged mixing tank to feed through supply lines 20, 22 into trough 10. As the level of the liquid in immersion trough 10 increases float 12 opens switch 14, deenergizes solenoid 16 and closes valve 18. This operation continues until the mixing tank charged with liquid ammonia-additive mixture on stream is empty. The second tank is charged, in the manner hereinafter described, while the first tank is on stream and is put on stream when the first tank is emptied. The empty mixing tank is taken off stream and re-charged.

In the method, or process, of the instant invention for mixing a measured amount of non-volatile material, such as, resins, dyes, or other fabric finishing materials, with a measured amount of volatile liquid ammonia, for dispersing the non-volatile material in the liquid ammonia and for maintaining the proportion of such measured amount of non-volatile material in such measured amount of volatile liquid at substantially a constant level, the volatile liquid ammonia is first fed into the insulated mixing vessel. A portion of the liquid ammonia volatilizes and, with the coolant circulated through the coolant coils in the insulated mixing vessel, lowers the temperature of the vessel and the liquid ammonia therein. As such temperature is lowered, the volatility of the liquid ammonia decreases and the level of the liquid ammonia in the vessel increases. When the liquid ammonia reaches a predetermined level in the mixing tank and while continuing to feed such liquid ammonia into the tank, a measured amount of the non-volatile material is fed into the mixing tank, added to the liquid ammonia and, by agitating the liquid ammonia, is substantially uniformly dispersed or distributed in the liquid ammonia in the mixing tank. While the non-volatile material is being added and dispersed and continuing, thereafter, the feed of liquid ammonia to the mixing tank is continued until the level of the liquid ammonia in the mixing tank reaches the measured amount. The feed of liquid ammonia to the mixing tank is then cut off but, as the liquid ammonia in the mixing tank volatilizes, additional liqid ammonia is added to the mixing tank to maintain the liquid level in the mixing tank at, substantially, a constant level.

Agitation of the liquid ammonia and the non-volatile material added thereto in the mixing tank, and the addition of liquid ammonia to the mixing tank to maintain the liquid level in such tank substantially constant, continues until the liquid ammonia-additive mixture in the tank is to be used. During the addition of the liquid ammonia and non-volatile material to the tank and while the material and liquid are being agitated, and additional liquid ammonia is being added to the mixing tank to maintain the liquid level substantially constant, the mixing tank is vented to an ammonia recovery system, an incinerator where the ammonia vapors are burned, or to the atmosphere.

When the liquid ammonia-additive mixture in the mixing tank is to be fed to the ammonia immersion trough 16 in the fabric treatment chamber 2, the feed of liquid ammonia to the mixing tank is cut off. The vent of the mixing tank containing the liquid ammonia-additive mixture to be fed, is cut off from the ammonia recovery system, the incinerator or the atmosphere, as the case may be, and the mixing tank is then vented to fabric treatment chamber 2. Thus, the ammonia vapor saturated condition of the atmosphere in the mixing vessel above the liquid ammonia-additive mixture in the mixing tank and the condition in the fabric treatment chamber 2 are substantially the same and stabilized. The liquid ammonia-additive mixture charged mixing tank is then on stream to feed liquid ammonia-additive mixture to fabric immersion trough 10, the liquid ammonia-additive mixture in the charged mixing tank being fed to trough 10 as the level of the mixture in such trough drops.

In charging the mixing tank in accordance with the instant invention, manual switch 118 is opened, de-energizing solenoid 36, closing valve 34 and de-energizing solenoid switch 116. Thus, micro-switch 114 is connected to the power supply, not shown. Because the mixing tank is then empty, floats 112 and 102 are down. With float 112 down, micro-switch 114 is closed and energizes solenoid 110, opens valve 98 and allows liquid ammonia from a source, not shown, to feed, through liquid ammonia line 96, into mixing chamber 70. With float 102 in the down position, micro-switch 104 is open. Hence, timer 110 and solenoid 94 are not energized. Valve 92 is closed and remains closed. No additive is fed into mixing chamber 70.

During the charging of the mixing tank, the tank being charged is vented to duct 4. Thus, the flapper valve to duct 47 is open and closed to duct 46, leading to chamber 2. When the tank is on stream, the flapper valve in the vent of the tank on stream is in the reverse position, i.e., vents the charged, on stream tank to duct 46 leading to chamber 2 and cuts-off the vent to duct 47.

While the liquid ammonia is being fed to the tank undergoing charge, coolant is pumped through coolant coils 86. Coolant coils 86, and the liquid ammonia vaporizing in the tank undergoing charge rapidly lower the temperature in mixing chamber 70 so that, as the ammonia level rises in mixing chamber 70 and the temperature within mixing chamber 70 lowers vaporization of the ammonia in mixing chamber 70 decreases. Thus, the amount of ammonia vapor discharged into duct 47 and recovered, burned, or discharged in the atmosphere, decreases. As the liquid ammonia level in mixing chamber 70 continues to rise, the ammonia level reaches float 102, lifts the floats and closes micro-switch 104. When micro-switch 104 closes, timer 110 is actuated and energizes solenoid 94 and opens valve 92. Additive, through additive supply line 90 is fed into mixing chamber 70. Timer 110 is set so that solenoid 94 is energized for a fixed time interval. Thus, valve 92 remains open for a fixed time interval and a measured amount of additive is fed, through supply line 90, into mixing chamber 70. At the end of the pre-set time interval, timer 110 de-energizes solenoid 94 and closes valve 92.

While the liquid ammonia and additive are being fed into mixing chamber 70, while the mixing chamber is charged and at stand-by and while the charged mixing chamber is on stream, mixer 80 is in operation and mixer impeller 84 continuously agitates the additive in the liquid ammonia, maintaining the additive dispersed in the liquid ammonia in mixing chamber 70.

During the addition of the additive to mixing chamber 70, through additive supply line 90 and open valve 92, liquid ammonia is being continuously fed, through liquid ammonia supply line 96 and open valve 98, into mixing chamber 70. When the liquid ammonia level in chamber 70 reaches float 112, the liquid ammonia in mixing chamber 70 raises float 112, opens micro-switch 114, de-energizes solenoid 100 and closes valve 98 cutting off further flow of liquid ammonia into mixing chamber 70. With the flow of liquid ammonia through feed line 96 cut off, the liquid ammonia-additive mixture in mixing chamber 70 is ready for use. However, at such time, the other mixing tank, previously charged and placed on stream, may not be empty. Thus, the more recently charged mixing tank must be maintained at a hold condition with the proper additive-to-liquid ammonia proportion and dispersion until such recently charged mixing tank is put on stream.

During such holding some of the liquid ammonia in the recently charged mixing tank will vaporize depending, of course, upon the temperature of the mixture. The liquid ammonia in such mixture is volatile and the additive is not. Thus, as the liquid ammonia vaporizes and the level in mixing chamber 70 falls, with the mixing tank on hold, the additive concentration in the mixture will increase. To avoid such increase in additive concentration and to maintain the additive-liquid ammonia, in the mixing tank at the desired concentration, when the liquid level in mixing chamber 70 drops float 112 lowers, closes microswitch 114, re-energizes solenoid 110 and re-opens valve 98. Thus, additional liquid ammonia is fed into mixing chamber 70 until the liquid level again rises, raises float 112, recloses micro-switch 114, de-energizes solenoid 110 and recloses valve 98. Hence, the liquid level in mixing chamber 70, while the mixing tank is on hold, is maintained at a substantially constant level.

The closing of switch 118, energizing of solenoid 36 and opening of valve 34, placing the charged mixing tank on stream opens valve 116 and de-energizes micro-switch 114 and solenoid 110. Thus, while the tank is on stream, further flow of liquid ammonia through feed line 96 into the on stream tank is cut off. While the tank is on stream, the tank is vented to chamber 2 through duct 46. Thus, ammonia vapor conditions in the area above the ammonia in the tank that is on stream and the vapor conditions in chamber 2 are equalized and substantially the same.

The method and apparatus of the instant invention may be utilized in the ammonia treatment of fabric where additive materials, in addition to the ammonia, are employed in the fabric treatment. Thus, the apparatus and process may be employed for the addition of any material that is compatible with liquid ammonia and can be dispersed therein.

In the foregoing description, two tanks have been described, one tank being on stream and the other tank being in the process of being charged or charged and on hold while the first tank is on stream and being emptied. It is to be understood that, in the operation of the instant apparatus and process, more than two tanks may be used. The use of additional tanks is of particular advantage where various fabrics are to be treated, one fabric after the other, with ammonia and different additives, or the same additives in different proportions, such as resins in different proportions.

The terms and expressions which have been employed are used as terms of description and not of limitation, and there is no intention in the use of such terms and expressions of excluding any equivalents of the features shown and described or portions thereof, but it is recognized that various modifications are possible.

What is claimed is:

1. A method for mixing a measured amount of non-volatile material with a measured amount of volatile liquid and for maintaining the proportion of such measured amount of material in such measured amount of liquid at substantially a constant level, the steps comprising, feeding said volatile liquid into an insulated vessel and by volatilizing a portion of said liquid and by circulating a coolant to lower the temperature of said vessel and said liquid therein, while continuing to feed said liquid into said vessel and after said liquid at said lowered temperature has reached a predetermined level in said vessel adding to said liquid in said vessel said measured amount of non-volatile material, continuing said feed of said liquid into said vessel until the liquid level of said volatile liquid in said vessel reaches said measured amount, as said liquid volatilizes, adding to said vessel additional of said liquid and maintaining said volatile liquid in said vessel at said measured amount and, while feeding said liquid and said non-volatile material to said vessel, agitating said liquid and said non-volatile material in said vessel.

2. A method, as recited in claim 1, in which said volatile liquid is liquid ammonia.

3. A method, as recited in claim 2, in which said non-volatile material is fabric finishing material.

4. A method, as recited in claim 3, in which said non-volatile material is a fabric dye.

5. A method, as recited in claim 3, in which said non-volatile material is a resin.

6. A method, as recited in claim 1, including the further steps of feeding said mixed and agitated liquid and non-volatile material from said vessel to a trough where said mixed liquid and material are to be used and, while said mixed and agitated liquid and material are being so fed, cutting off the further feed of liquid into said vessel.

7. A method, as recited in claim 6, in which said measured amount of non-volatile material and said measured amount of volatile liquid are fed, mixed, agitated and maintained at substantially a constant level sequentially in a plurality of insulated vessels, all connected to said trough, said feeding, mixing and agitation being carried on in one of said vessels with the mixed and agitated liquid and material from another of said vessels is being fed to said trough.

8. A method, as recited in claim 7, in which said volatile liquid is liquid ammonia.

9. A method, as recited in claim 8, in which said non-volatile material is fabric finishing material.

10. A method, as recited in claim 9, in which said non-volatile material is a fabric dye.

11. A method, as recited in claim 9, in which said non-volatile material is a resin.

12. A method for mixing a measured amount of non-volatile material with a measured amount of volatile liquid and for maintaining the proportion of such measured amount of material in such measured amount of liquid at substantially a constant level, the steps comprising, feeding said volatile liquid into a vessel and by volatilizing a portion of said liquid to lower the temperature of said vessel and said liquid therein, while continuing to feed said liquid into said vessel and after said liquid at said lowered temperature has reached a predetermined level in said vessel adding to said liquid in said vessel said measured amount of non-volatile material, continuing said feed of said liquid into said vessel until the liquid level of said volatile liquid in said vessel reaches said measured amount, as said liquid volatilizes, adding to said vessel additional of said liquid and maintaining said volatile liquid in said vessel at said measured amount and, while feeding said liquid and said non-volatile material to said vessel, agitating said liquid and said non-volatile material in said vessel.

* * * * *